US007031117B2

(12) United States Patent
Nguyen et al.

(10) Patent No.: US 7,031,117 B2
(45) Date of Patent: Apr. 18, 2006

(54) MODULAR ROTARY ACTUATOR ASSEMBLY FOR A ROTATABLE MEDIA DATA STORAGE DEVICE

(75) Inventors: Christopher Nguyen, Union City, CA (US); Richard G. Ramsdell, Saratoga, CA (US)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 64 days.

(21) Appl. No.: 10/366,074

(22) Filed: Feb. 13, 2003

(65) Prior Publication Data

US 2004/0125506 A1 Jul. 1, 2004

Related U.S. Application Data

(60) Provisional application No. 60/437,109, filed on Dec. 30, 2002.

(51) Int. Cl.
*G11B 5/55* (2006.01)

(52) U.S. Cl. ................................ 360/265.9; 360/266.1

(58) Field of Classification Search ............ 360/265.9, 360/266.1
See application file for complete search history.

(56) References Cited

U.S. PATENT DOCUMENTS

| | | | | |
|---|---|---|---|---|
| 4,860,135 A | | 8/1989 | Cain | 360/97.02 |
| 4,912,583 A | | 3/1990 | Hinlein | 360/244.5 |
| 4,942,491 A | | 7/1990 | Osawa et al. | 360/265.9 |
| 4,994,931 A | * | 2/1991 | Foote | 365/106 |
| 5,034,837 A | | 7/1991 | Schmitz | 360/105 |
| 5,040,086 A | | 8/1991 | Hibino | 360/264.1 |
| 5,099,373 A | | 3/1992 | Shibata et al. | 360/265.9 |
| 5,109,310 A | | 4/1992 | Ohkjita et al. | 360/264.3 |
| 5,119,537 A | | 6/1992 | Hamanaka et al. | 29/603.03 |
| 5,184,265 A | | 2/1993 | Foote et al. | 360/265.9 |
| 5,235,482 A | | 8/1993 | Schmitz | 360/97.02 |
| 5,382,851 A | | 1/1995 | Loubier | 310/13 |

(Continued)

FOREIGN PATENT DOCUMENTS

FR 744482 A2 11/1996

(Continued)

OTHER PUBLICATIONS

"A novel suspension arm with 2-dimensional actuation, for flying height control and high-bandwidth track following in advanced hard disk drives"; Chilumbu, C.; Clegg, W.; Jenkins, D.; Robinson, P.; 1-4 May 2000; pp.: 562-566.

*Primary Examiner*—A. J. Heinz
(74) *Attorney, Agent, or Firm*—Fliesler Meyer LLP

(57) ABSTRACT

Assemblies in accordance with the present invention can access a data storage medium having one or more disks. One such assembly comprises a mounting block including a bore and spacer, an arm stack connected with the top surface of the spacer, and a bottom arm connected with the bottom surface of the spacer. The arm stack comprises module(s) stacked on a top arm. The arm stack and bottom arm are designed such that either can be disconnected from the mounting block without disassembling the bore. By having a removably fastened arm stack and bottom arm, the assembly can be built at a relatively low cost without deformation. This description is not intended to be a complete description of, or limit the scope of, the invention. Other features, aspects, and objects of the invention can be obtained from a review of the specification, the figures, and the claims.

13 Claims, 6 Drawing Sheets

U.S. PATENT DOCUMENTS

| | | | | | |
|---|---|---|---|---|---|
| 5,404,636 | A | | 4/1995 | Stefansky et al. | 29/603 |
| 5,491,598 | A | | 2/1996 | Stricklin | |
| 5,495,375 | A | * | 2/1996 | Baasch et al. | 360/266.1 |
| 5,508,860 | A | | 4/1996 | Takagi et al. | 360/97.01 |
| 5,535,074 | A | | 7/1996 | Leung | 360/265.9 |
| 5,571,519 | A | | 11/1996 | Synodis et al. | |
| 5,627,702 | A | | 5/1997 | Kelemen | |
| 5,646,802 | A | | 7/1997 | Akiyama et al. | 360/244.6 |
| 5,691,581 | A | * | 11/1997 | Umehara et al. | 310/13 |
| 5,731,934 | A | | 3/1998 | Brooks et al. | 360/266.1 |
| 5,862,019 | A | * | 1/1999 | Larson | 360/265.8 |
| 5,875,072 | A | | 2/1999 | Brooks, Jr. et al. | 360/104 |
| 5,877,919 | A | | 3/1999 | Foisy | 360/104 |
| 5,986,852 | A | | 11/1999 | Berg et al. | 360/265.9 |
| 6,128,164 | A | | 10/2000 | Kant | 360/244.5 |
| 6,166,886 | A | | 12/2000 | Toensing | 360/244.5 |
| 6,185,075 | B1 | | 2/2001 | Tsujino | |
| 6,230,959 | B1 | | 5/2001 | Heist et al. | 228/155 |
| 6,256,173 | B1 | | 7/2001 | Chee | |
| 6,446,325 | B1 | | 9/2002 | Prater | 29/603.03 |
| 6,469,872 | B1 | | 10/2002 | Kant et al. | 360/265.7 |
| 6,525,910 | B1 | | 2/2003 | Macpherson | |
| 6,725,526 | B1 | | 4/2004 | Lille | 29/603.1 |
| 6,836,387 | B1 | | 12/2004 | Ohba et al. | 360/97.01 |
| 2002/0064000 | A1 | | 5/2002 | Liu et al. | |

FOREIGN PATENT DOCUMENTS

| | | |
|---|---|---|
| GB | 2170345 | 7/1986 |
| JP | 04276364 A | 10/1992 |

* cited by examiner

MODULAR ROTARY ACTUATOR ASSEMBLY FOR A ROTATABLE MEDIA DATA STORAGE DEVICE

PRIORITY CLAIM

This application claims priority to the following U.S. Provisional Patent Application:

U.S. Provisional Patent Application No. 60/437,109, entitled "Modular Rotary Actuator Assembly for a Rotatable Media Data Storage Device," filed Dec. 30, 2002.

CROSS-REFERENCED CASES

This application incorporates by reference all of the following co-pending applications:

U.S. patent application Ser. No. 10/365,932, entitled "Rotary Actuator Assembly for a Rotatable Media Data Storage Device," filed Feb. 13, 2003.

U.S. patent application Ser. No. 10/366,235, entitled "Methods for Assembling or Reworking a Rotary Actuator Assembly for a Rotatable Media Data Storage Device," filed Feb. 13, 2003.

U.S. patent application Ser. No. 10/365,934 entitled "Methods for Assembling or Reworking a Modular Rotary Actuator Assembly for a Rotatable Media Data Storage Device," filed Feb. 13, 2003.

U.S. patent application Ser. No. 10/365,912, entitled "Removable Bearing Assembly in a Rotary Actuator Assembly for a Rotatable Media Data Storage Device," filed Feb. 13. 2003.

U.S. patent application Ser. No. 10/365,906, entitled "Method for Seating a Removable Bearing Assembly in a Rotary Actuator Assembly for a Rotatable Media Data Storage Device," filed Feb. 13, 2003.

FIELD OF THE INVENTION

The present invention relates generally to rotatable media data storage devices, as for example magnetic or optical hard disk drive technology, and more specifically to actuator assemblies for positioning heads in hard disk drives.

BACKGROUND OF THE INVENTION

Computer systems are fundamentally comprised of subsystems for storing and retrieving information, manipulating information, and displaying information. Nearly all computer systems today use optical, magnetic or magneto-optical storage media to store and retrieve the bulk of a computer system's data. Successive generations of ever more powerful microprocessors, and increasingly complex software applications that take advantage of these microprocessors, have driven the storage capacity needs of systems higher and have simultaneously driven read and write performance demands higher. Magnetic storage remains one of the few viable technologies for economically storing large amounts of information with acceptable read and write performance.

Market pressures place ever greater demands on hard disk drive manufacturers to reduce drive costs. In order to maintain market advantage, new hard disk drive designs typically incorporate greater efficiency in device operating tolerances or manufacturability.

There are basic components common to nearly all hard disk drives. A hard disk drive typically contains one or more disks clamped to a rotating spindle, a head for reading or writing information to the surface of each disk, and an actuator assembly utilizing linear or rotary motion for positioning the head for retrieving particular information or writing information to a particular location on the disk. A rotary actuator is a complex assembly that couples the head to a pivot point that sweeps the head across the surface of the rotating disk. The assembly typically couples the head to a flexible member called a suspension, which is then coupled to the pivotally mounted actuator assembly.

The current state of the art is to use one of two basic designs for attaching the suspensions with the actuator assembly: (1) the one-piece E-shaped block assembly (generally referred to as an E-block) or (2) the multi-piece assembly with unitary mounted suspension (generally referred to as Unamount). The E-block, typically made of aluminum or magnesium, is cast or extruded as a singular block element and machined to provide attachment points for suspensions (the attachment points form rigid arms). One or two suspensions are connected with each arm by swaging or staking through a machined bore in the arm which is aligned with a bore in the suspension. Swaging uses steel balls slightly larger in diameter than the machined bores to apply axial forces which deform and attach the suspensions to the arms.

Swaging applies force to the suspension and can deform a cantilevered portion of the suspension used to hold a slider on which a head is mounted. Deformation of the cantilevered portion of the suspension can lead to structural resonance variation and reduction in the reliability of ramp-based head loading and unloading. In order to control the amount of deforming force applied to the suspension with each impact, multiple steel balls with increasing diameters are often used in the swaging process. Damage can still result to the suspension. As data storage tracks are packed more tightly and as actuator arm block sizes shrink, requiring more precise performance of the actuator assembly, this problem will likely become acute, impacting future manufacturing yields. Further, it is difficult to maintain the preset spring rate and gram load of the suspensions during the swaging process, and suspension alignment and staking must be supervised and monitored, increasing the cost and decreasing the speed of assembly of the drives.

The Unamount assembly uses an actuator arm plate that includes a circular bore which, when coupled to spacer elements, forms a cylindrical bore designed to receive a bearing assembly. Each suspension is micro-spot welded to each actuator arm plate, which is then secured to the spacers and other such arm assemblies in a rigid manner to form the actuator assembly. The Unamount assembly has significant disadvantages including higher assembly cost, difficult assembly cleaning, potential for component damage during rework (the rigid assembly must be unfastened and the bearing assembly removed or exposed to detach a single arm plate), and less design flexibility due to the difficulty of structurally tuning the arm and suspension resonances at the same time.

BRIEF DESCRIPTION OF THE FIGURES

Further details of embodiments of the present invention are explained with the help of the attached drawings in which.

DETAILED DESCRIPTION

Figure 1A:
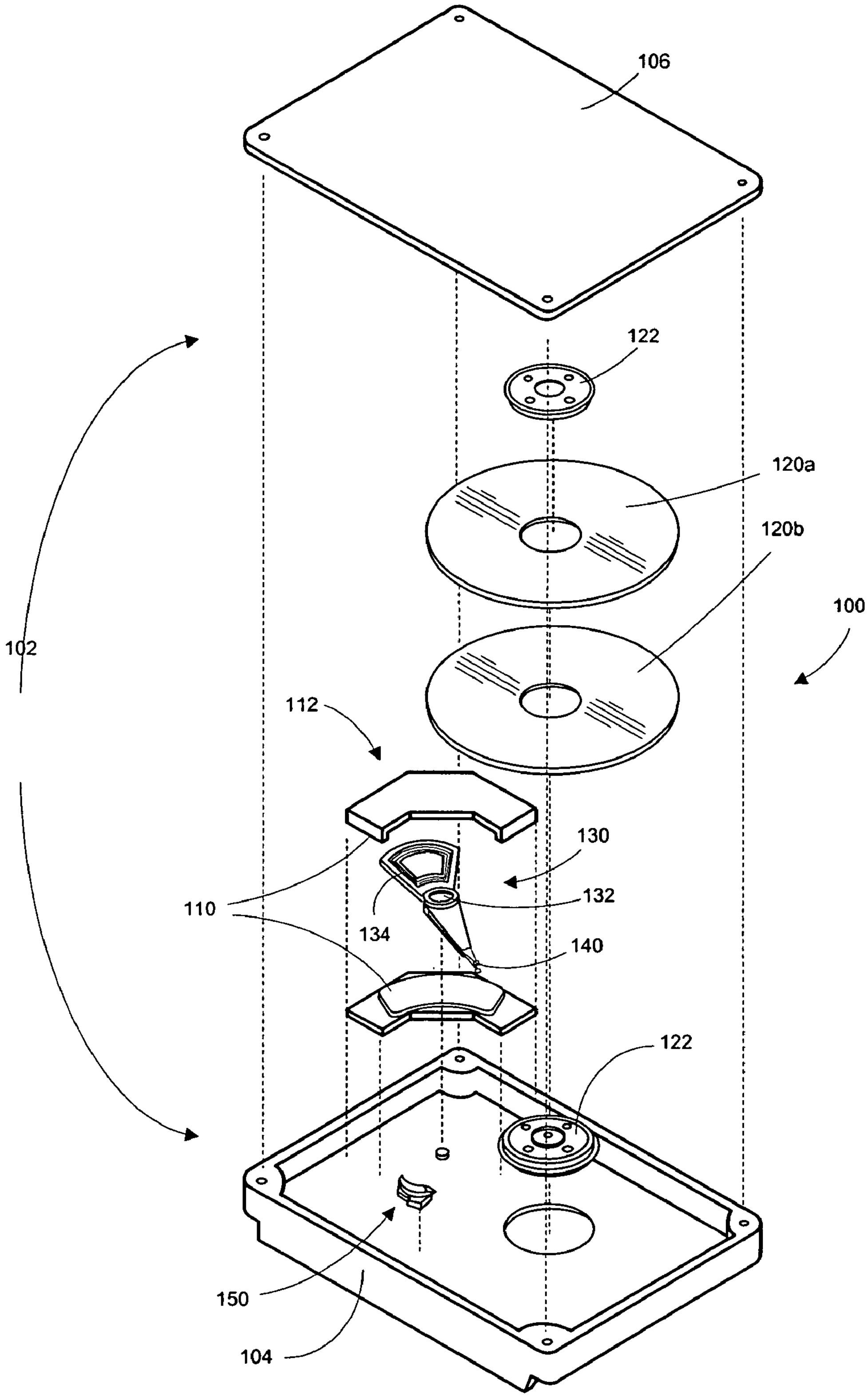
FIG. 1A is an exploded view of a typical hard disk drive utilizing an actuator assembly in accordance with one embodiment of the present invention.

FIG. 1A is an exploded view of a hard disk drive 100 utilizing an actuator assembly in accordance with one embodiment of the present invention. The hard disk drive 100 has a housing 102 which is formed by a housing base 104 and a housing cover 106. Two disks 120 are attached to the hub of a spindle motor 122, with the spindle motor 122 mounted to the housing base 104. Each disk 120 can be made of a light aluminum alloy, ceramic/glass or other suitable substrate, with magnetic material deposited on one or both sides of the disk 120. The magnetic layer has tiny domains of magnetization for storing data transferred through heads. The invention described herein is equally applicable to technologies using other media, as for example, optical media. Further, the invention described herein is equally applicable to devices having any number of disks attached to the hub of the spindle motor. The disks are connected to a rotating spindle 122 (for example by clamping), spaced apart to allow heads to access the surfaces of each disk, and rotated in unison at a constant or varying rate typically ranging from less than 3,600 RPM to over 15,000 RPM (speeds of 4,200 and 5,400 RPM are common in hard disk drives designed for mobile devices such as laptops).

Figure 1B:
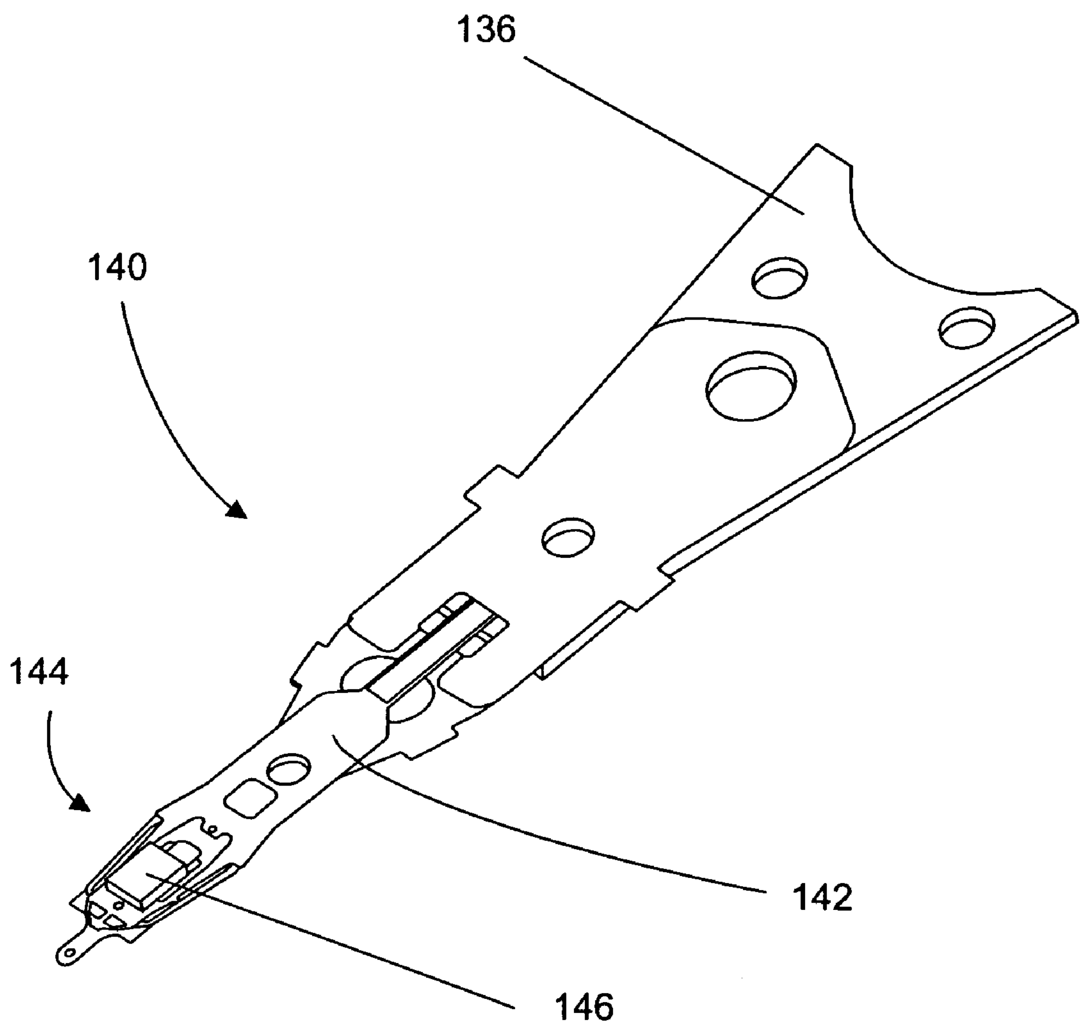
FIG. 1B is a close-up view of a head suspension assembly used in the hard disk drive of FIG. 1A, showing head, slider and suspension.
Figure 1C:
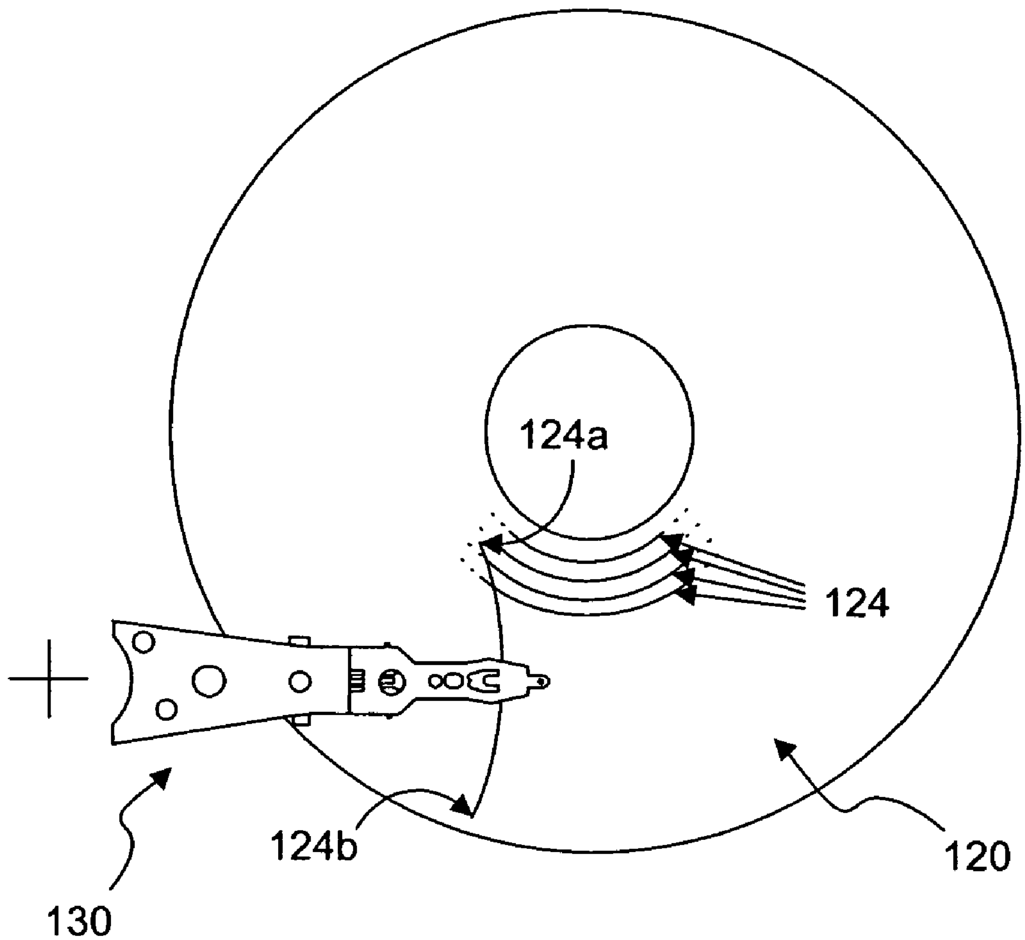
FIG. 1C is an illustration of the rotary motion of a head suspension assembly of FIG. 1B across the surface of a disk.

The actuator assembly 130 is pivotally mounted to the housing base 104 by a bearing assembly 132 and sweeps an arc, as shown in FIG. 1C, between at least an inner actuator addressable diameter of the disks 124*a* and an outer actuator addressable diameter of the disks 124*b*. Attached to the housing 104 are upper and lower magnet return plates 110 and at least one magnet that together form the stationary portion of the voice coil motor assembly 112. The voice coil 134 is mounted to the actuator assembly 130 and positioned in the air gap of the voice coil motor 112 which applies a force to the actuator assembly 130 to provide the pivoting motion about the bearing assembly 132. The voice coil motor allows for precise positioning of each head 146 along each surface of each disk 120. The voice coil motor 112 is coupled with a servo system (not shown) to accurately position the head 146 over a specific track on the disk 120. The servo system acts as a guidance system, using positioning code (for example grey code) read by the head 146 from the disk 120 to determine the position of the head 146 on tracks 124 of the disk 120. The actuator assembly 130 is shown in FIG. 1B to have an overall wedge-shape, but could alternatively have a variety of shapes: for example, the actuator assembly could be rectangular or oblong, or shaped like an arrow.

The heads 146 (FIG. 1B) read and/or write data to the disks. Each side of a disk 120 can have an associated head 146, and the heads 146 are collectively coupled to the actuator assembly 130 such that the heads 146 pivot in unison. When not in use, the heads 146 can rest on the stationary disks 120 (typically on an inner portion of the disk that does not contain data) or on a ramp 150 positioned either adjacent to the disks or just over the disk surface.

FIG. 1B details a subassembly commonly referred to as a head suspension assembly (HSA) 140, comprising the head 146 attached to a slider 144, which is further attached to a flexible suspension member (a suspension) 142. The spinning of the disks 120 creates air pressure beneath the slider 144 that lifts the slider 144 and consequently the head 146 off of the surface of the disk 120, creating a micro-gap of typically less than four micro-inches between the disk 120 and the head 146 in one embodiment. The suspension 142 is bent or shaped to act as a spring such that a load force is applied to the surface of the disk. The "air bearing" created by the spinning of the disks 120 resists the spring force applied by the suspension 142, and the opposition of the spring force and the air bearing to one another allows the head 146 to trace the surface contour of the rotating disk surface, which is likely to have minute warpage, without "crashing" against the disk surface. When a head "crashes", the head collides with a surface such that the head is damaged.

Figure 2:
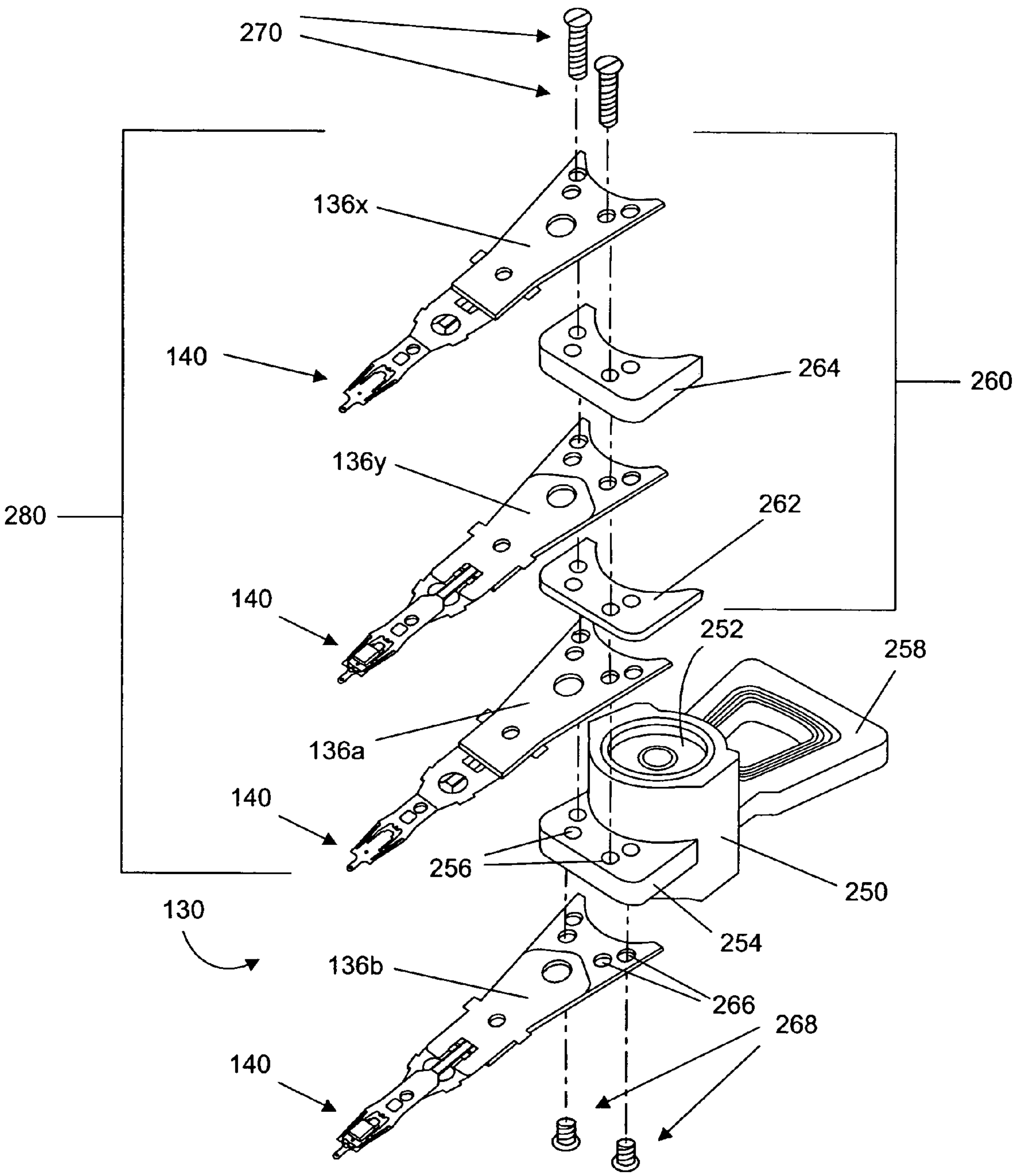
FIG. 2 is an exploded view of an actuator assembly in accordance with one embodiment of the invention.

The HSA 140 is connected to the actuator assembly 130 by a rigid arm 136. As described above, the suspension 142 is typically swaged to the rigid arm, or micro-spot welded to an arm plate which forms part of the bearing assembly bore. FIG. 2 is an exploded view of one embodiment of the actuator assembly 130 contemplated in the present invention. The actuator assembly 130 comprises a mounting block 250 having a solid bore 252 for receiving a bearing assembly 132. A spacer 254 is formed at a first end of the mounting block 250 (by casting, extruding or milling, for example). The spacer 254 is at least as thick as a disk 120 and has at least one, and preferably four threaded holes 256 extending through the width of the spacer 254 for engaging the threads of screws 268, 270. In alternative embodiments one or more threaded holes 256 through the top and bottom of the spacer only partially penetrate the spacer. In still other embodiments the spacer holes 256 are not threaded, but smooth for receipt of bolts or other fasteners. A voice coil holder 258 is mounted at a second end of the mounting block 250, and retains a voice coil 134. The voice coil holder 258 can be cast as part of a singular block element with the mounting block 250, adhesively bonded or plastic over-molded onto the mounting block 250, or alternatively welded or soldered to the mounting block 250. One of ordinary skill in the art can appreciate the different methods for fastening the voice coil holder 258 to the mounting block 250.

Providing a solid bore 252 simplifies the cleaning process and allows flexibility in choosing the technique for journaling pivot bearings. The bearing assembly 132 can be comprised of a separate cartridge bearing which can be installed after head stack assembly cleaning, or alternatively can include discrete bearings positioned in the actuator bore 252.

As indicated above, the HSA 140 is connected with the actuator assembly 130 by an arm 136. The arm 136 can be stamped or milled and made from stainless steel, aluminum, magnesium, titanium or other suitable material. The arm 136 includes at least one, but preferably four holes 266 at the distal end for receiving screws 268, 270. In one embodiment, the suspension 142 is micro-spot welded to the proximal end of the arm 136. In alternative embodiments, the suspension 142 is adhesively bonded to the arm 136. In still other embodiments the suspension 142 and the respective arm 136 comprise a single stamped piece.

A hard disk drive with two disks according to the present invention is assembled with a first arm 136*a*, a second arm

136*b* and at least one module 260 removably fastened to the spacer 254. For a hard disk drive with two disks, a first arm 136*a* and one module 260 are stacked together and removably fastened to the top surface of the spacer 254 by at least one, and preferably two screws 270. A module 260 consists of a first module arm 136*x*, a second module arm 136*y*, a module spacer 264 stacked between the first module arm 136*x* and the second module arm 136*y*, and an insert 262 stacked between the second module arm 136*y* and either a previous module 260, or the first arm 136*a*. The first arm 136*a* and the module 260 (or modules 260) comprise an arm stack 280.

The arm stack is assembled such that the holes 266 of the first arm 136*a* are aligned with the holes of the components of the module 260. The holes of the module spacer 264 and insert 262 are smooth to receive screws 270. The screws 270 are positioned so that they perferably engage the threads of two of four threaded holes 256 in the spacer 254.

The module spacer 264 is at least as thick as a first disk 120*a*, and is stacked between the first module arm 136*x* and the second module arm 136*y* such that the suspension 142 mounted on the first module arm 136*x* applies a load force against the top surface of the first disk 120*a* mounted in the plane of the module spacer 264, and the suspension 142 mounted on the second arm 136*y* applies a load force against the bottom surface of the first disk 120*a*. The insert 262 is as thick as required to approximate the space between the first disk 120*a* and a second disk 120*b*.

The first arm 136*a* is stacked on the top surface of the first spacer 254 such that the suspension 142 mounted on the first arm 136*a* applies a load force against the top surface of the second disk 120*b* mounted in the plane of the spacer 254. The arm stack 280 is disconnected from the actuator assembly 130 by unfastening the screws 270 from the top surface of the spacer 254.

A second arm 136*b* is removably fastened to the bottom surface of the spacer 254 by at least one, and preferably two screws 268 such that the suspension 142 applies a load force against the bottom surface of the second disk 120*b*. The screws 268 are positioned to preferably engage the threads of two of the four threaded holes 256 in the spacer 254 such that they do not interfere with the screws 270 that removably fasten the arm stack to the top surface of the spacer 254. Thus, the first disk 120*a* is positioned between the first module arm 136*x* and the second module arm 136*y* and the second disk 120*b* is positioned between the first arm 136*a* and second arm 136*b*. Accordingly, this embodiment of the invention includes an actuator assembly that can be built at a relatively low cost and without the misalignment and deformation associated with the prior art assemblies. Further, arms 136 and modules 260 having different thicknesses or shapes can be easily substituted, thus allowing tuning of resonant frequencies according to the needs of the product while minimizing additional manufacturing costs. These needs may be dictated by spindle speed, shock and vibration performance requirements or other parameters.

In alternative embodiments, a first HSA 140 can be attached to the bottom surface of the first arm 136*a* and a second HSA 140 can be attached to the top surface of the first arm 136*a*, thereby eliminating the need for the insert 262 and the second module arm 136*y*. Additional modules 260 would be added by first attaching an HSA 140 to the top surface of the previous module 260. In still other embodiments, an arm stack 280 can be built for three disks by adding an additional module 260. The modular arm stack arrangement provides flexibility in manufacturing at a relatively low cost.

The invention described herein is equally applicable to technologies using other read/write devices, for example lasers. In such an alternative embodiment, the HSA 140 would be substituted with an alternative read/write device, for example a laser, which could be either removably or fixedly attached to an arm 136, in a similar manner as described above (micro-spot welding, adhesives, single-piece stamping). The arm 136 is subsequently removably fastened to mounting block 250 in the manner described above.

Figure 3:
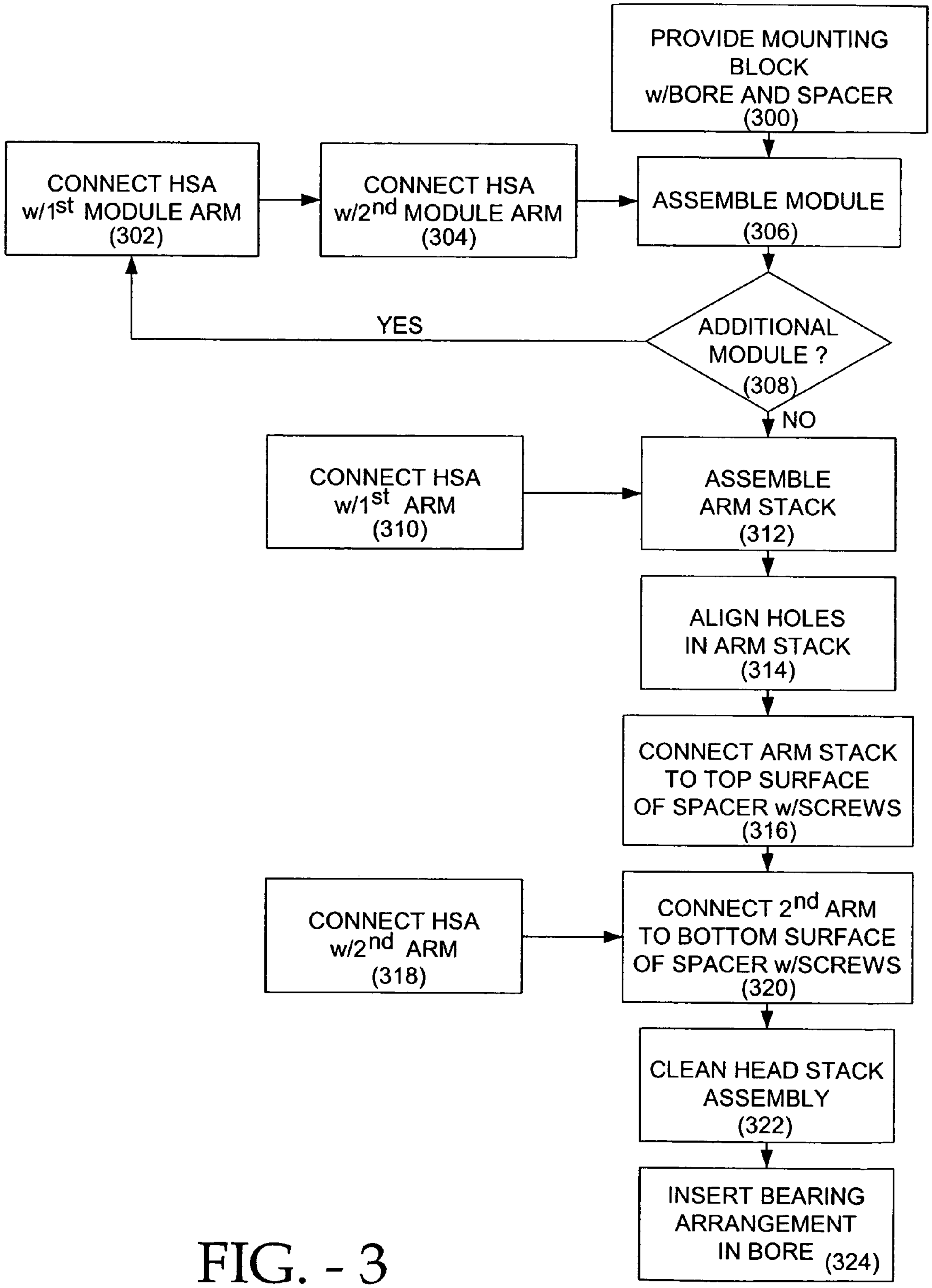
FIG. 3 is a block diagram of a method for manufacturing an actuator assembly in accordance with one embodiment of the invention.

FIG. 3 is a representation of a method for manufacturing the actuator assembly represented in FIG. 2. As shown as the first step 300, a mounting block 250 is provided, the mounting block having a central, cylindrical bore 252. Further, the mounting block has a spacer 254 at a first end for attaching arms 136 and a voice coil holder 258 at a second end that retains a voice coil. A HSA 140 is micro-spot welded, or alternately adhesively fastened, to a first module arm 136*x* (step 302). Similarly, a HSA 140 is micro-spot welded to a second module arm 136*y* (step 304), a HSA 140 is micro-spot welded to a first arm 136*a* (step 310) and a HSA 140 is micro-spot welded to a second arm 136*b* (step 318). In other embodiments, an arm 136 and a suspension 142 can be stamped as a single piece, wherein a head 146 connected with a slider 144 could be mounted to each arm/suspension prior to connecting each arm/suspension to the mounting block 250. In still other embodiments, a HSA 140 can be micro-spot welded to the top surface of the first arm 136*a*, thereby eliminating the second module arm 136*x*.

A module 260 is assembled in the following order from top to bottom: the first module arm 136*x*, the module spacer 264, the second module arm 136*y*, and the insert 262. The module 260 is stacked on top of the first arm 136*a* to form an arm stack 280 (step 312). The four holes of each part of the arm stack 280 are aligned (step 314) and the arm stack 280 is removably fastened to the top surface of the spacer 254 by the screws 270 (step 316). The second arm 136*b* is removably fastened to the bottom surface of the spacer 254 (step 320). The completed assembly, known as the head stack assembly, can then be cleaned (step 310) prior to mounting the bearing assembly 132. The heads stack assembly is mounted onto the bearing assembly 132 (step 312) such that the head stack assembly rotates freely about the bearing assembly. As described in regards to FIGS. 1A and 2, the bearing assembly 132 can comprise a cartridge bearing, or discrete bearings solidly attached in the actuator bore section. In other embodiment at least some of the arms 136 can be mounted to the mounting block after the mounting block is positioned onto the bearing assembly. In still other embodiments, additional modules 260 can be added to the arm stack to access additional disks (step 308).

Figure 4:
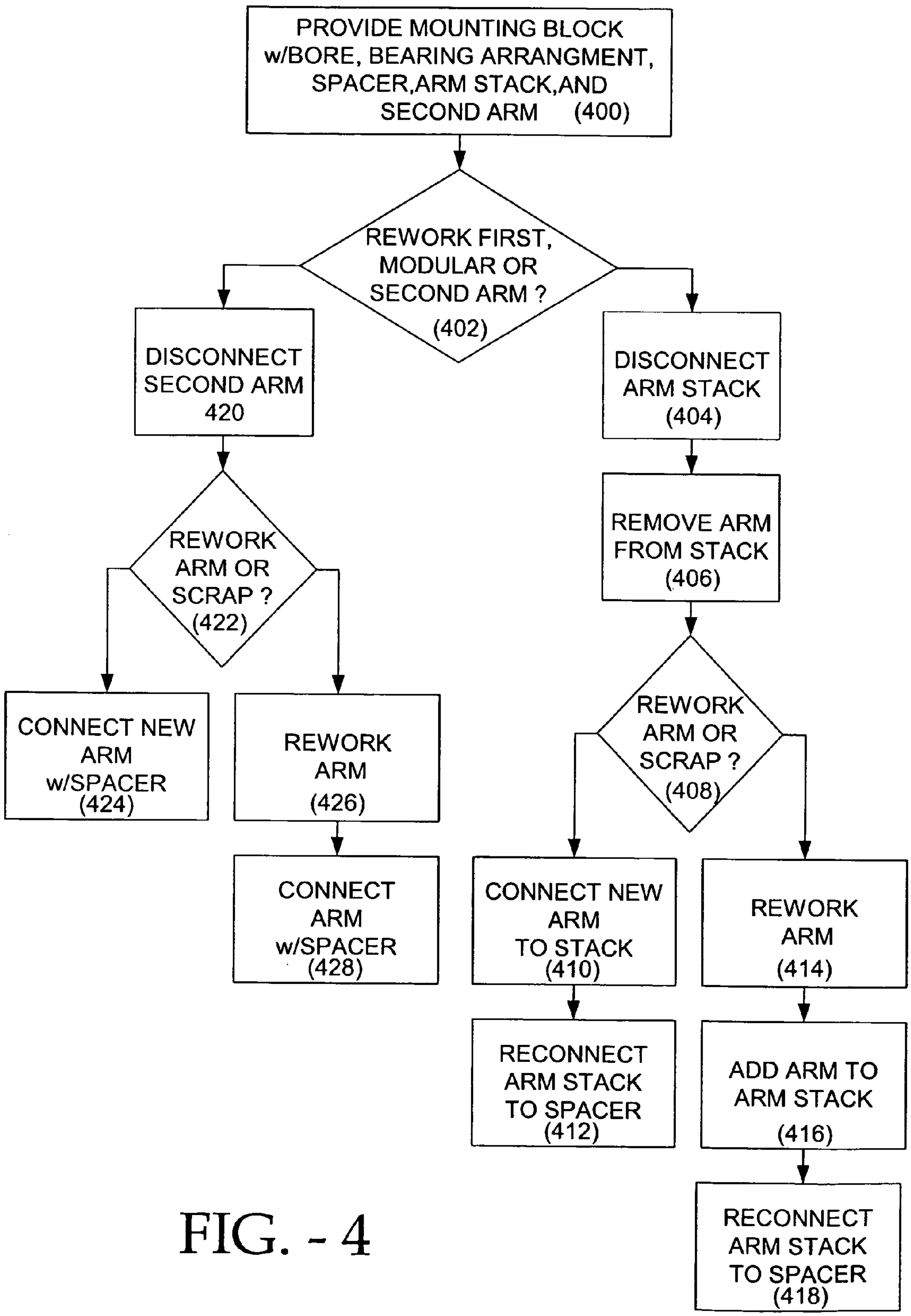
FIG. 4 is a block diagram of a method for reworking an actuator assembly in accordance with one embodiment of the invention.

FIG. 4 is a representation of a method for reworking an actuator assembly represented in FIG. 2. If the actuator assembly 130 is mounted within hard disk drive 100 (step 400), the actuator assembly is removed from the hard disk drive 100. If an arm 136 or HSA 140 from the arm stack 280 requires rework, the entire arm stack 280 is unfastened from the actuator assembly 130 (step 404). The damaged arm 136 or the arm 136 with the damaged HSA 140 is removed from the arm stack 280 (step 406). The arm 136 is then either replaced with a substitute arm 136 and HSA 140 (steps 410) or the arm 136 is reworked (step 414) and subsequently placed back in position in the arm stack 280 (step 416). The arm stack 280 is then reconnected with the spacer 254 (step 412, 418).

If the second arm 136*b* or the HSA 140 attached to the second arm 136*b* requires rework, the second arm 136*b* is unfastened from the actuator assembly 130 (step 420). The second arm **136*b* is then either replaced with a substitute arm 136 and HSA 140 connected with the substitute arm 136 (step 424) or the second arm 136*b* is reworked (steps 426), and subsequently reattached to the actuator assembly 130 (step 428). In other embodiments, the actuator assembly 130 is not removed from the hard disk drive 100. The method represented in FIG. 4 provides the significant advantage of fast rework without removing the bearing assembly 132**.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. An actuator assembly adapted to access a data storage medium, the actuator assembly comprising:

a mount including a bore adapted to receive a bearing assembly;

a spacer extending from the mount, the spacer including a top surface and a bottom surface;

wherein the top surface includes one or more holes extending from the top surface at least partially through the spacer;

wherein the bottom surface includes one or more holes extending from the bottom surface at least partially through the spacer;

a bottom arm removably connected with the bottom surface of the spacer by one or more fasteners, the one or more fasteners engaging a corresponding holes; and an arm stack removably connected with the top surface of the spacer by one or more fasteners, the one or more fasteners engaging a corresponding holes, the arm stack including:

a top arm, a module, and an insert disposed between the top arm and the module, wherein the module includes:

a first module arm, a second module arm, and a module spacer disposed between the first module arm and the second module arm;

wherein the bottom arm and the arm stack are adapted to be disconnected from the spacer without disassembling the bore.

2. The actuator assembly of the claim 1, wherein the arm stack is removably connected with the top surface of the spacer by screws.

3. The actuator assembly of claim 2, wherein the bottom arm is removably connected with the bottom surface of the spacer by screws.

4. The actuator assembly of claim 1, wherein the bearing assembly is a cartridge bearing.

5. The actuator assembly of claim 1 wherein the top arm, the first module arm, the second module arm, and the bottom arm comprise a metal selected from the group consisting of stainless steel, aluminum, titanium, and magnesium.

6. An actuator assembly adapted to access a data storage medium, the actuator assembly comprising:

a mount including a bore adapted to receive a bearing assembly;

the bearing assembly arranged so that a journal of the bearing assembly is disposed within the bore;

a spacer extending from the mount, the spacer having a top surface and a bottom surface;

a top arm disposed over the top surface of the spacer;

a module removably disposed over the top arm;

an insert disposed between the top arm and the module;

wherein the module includes:

a first module arm;

a second module arm; and a module spacer disposed between the first module arm and the second module arm;

wherein the module spacer is adapted to be disassociated from the mount when the module is removed from disposition over the top arm.

7. The actuator assembly of claim 6, wherein the top arm and the module are removably connected with the top surface of the spacer by screws.

8. The actuator assembly of claim 6, further including a bottom arm disposed below the bottom surface of the spacer.

9. The actuator assembly of claim 8, wherein the bottom arm is removably connected with the bottom surface of the spacer by screws.

10. The actuator assembly of claim 6, wherein the bearing assembly is a cartridge bearing.

11. The actuator assembly of claim 6, wherein the top arm, the first module arm, and the second module arm comprise a metal selected from the group consisting of stainless steel, aluminum, titanium, and magnesium.

12. An assembly to perform an operation with one or more data storage mediums, the assembly comprising:

an actuator assembly including:

a mounting block having a first end and a second end, a bore disposed within the mounting block, a bearing assembly arranged so that a journal of the bearing assembly is disposed within the bore;

a voice coil holder extending from the first end of the mounting block, and a spacer extending from the second end of the mounting block, wherein the spacer includes a top surface and a bottom surface;

a bottom arm assembly removably connected with the bottom surface of the spacer, the bottom arm assembly having a bottom arm and a bottom head operably associated with the bottom arm; and an arm stack assembly removably connected with the top surface of the spacer, the arm stack assembly including:

a top arm assembly having a first arm and a first head operably associated with the first arm, a module disposed over the top arm, and an insert disposed between the top arm and the module, wherein the module includes:

a first module arm assembly including a first module arm and a first module head operably associated with the first module arm, a second module arm assembly including a second module arm and a second module head operably associated with the second module arm, and a module spacer disposed between the first module arm assembly and the second module arm assembly;

wherein the insert and the module are adapted to be disassociated from the mounting block when the arm stack assembly is removed from the top surface of the spacer.

13. An apparatus for data storage comprising:

a housing;

a spindle motor connected with the housing;

a disk rotatably connected with the spindle motor;

an actuator assembly pivotally connected with the housing, the actuator assembly including a bore to receive a bearing assembly;

the bearing assembly arranged so that a journal of the bearing assembly is disposed within the bore;

an arm stack assembly removably connected with the actuator assembly, the arm stack assembly including:

a top arm assembly having a first arm and a first head operably associated with the first arm, a module disposed over the top arm, and an insert disposed between the top arm and the module, wherein the module includes:

a first module arm assembly including a first module arm and a first module head operably associated with the first module arm, a second module arm assembly including a second module arm and a second module head operably associated with the second module arm, and a module spacer disposed between the first module arm assembly and the second module arm assembly;

wherein the insert and the module are adapted to be disassociated from the actuator assembly when the arm stack assembly is removed from the actuator assembly.

* * * * *

UNITED STATES PATENT AND TRADEMARK OFFICE

CERTIFICATE OF CORRECTION

PATENT NO. : 7,031,117 B2 Page 1 of 1
APPLICATION NO. : 10/366074
DATED : April 18, 2006
INVENTOR(S) : Christopher Nguyen and Richard G. Ramsdell It is certified that error appears in the above-identified patent and that said Letters Patent is hereby corrected as shown below:

In Column 7, Claim 1, after line 27, insert the paragraph -- the bearing assembly arranged so that a journal of the bearing assembly is disposed within the bore; --

In Column 7, Claim 1, line 38, after "or more fasteners engaging a corresponding" remove "holes" and insert -- hole --

In Column 7, Claim 1, line 42, after "fasteners engaging a corresponding" remove "holes" and insert -- hole --

In Column 7, Claim 1, line 53, remove the entire sentence "wherein the bottom arm and the arm stack are adapted to be disconnected from the spacer without disassembling the bore." and insert the following sentence --wherein the insert and the module spacer are adapted to be disassociated from the mount when the arm stack is removed from the top surface of the spacer. --

Signed and Sealed this

Seventh Day of August, 2007

JON W. DUDAS

*Director of the United States Patent and Trademark Office*